US007079276B2

(12) United States Patent
Kimura

(10) Patent No.: US 7,079,276 B2
(45) Date of Patent: Jul. 18, 2006

(54) PRINT SYSTEM, PRINT DATA MANAGEMENT SYSTEM AND PRINTER

(75) Inventor: Shuji Kimura, Kato (JP)

(73) Assignee: Fuji Xerox Co., Ltd., Tokyo (JP)

( * ) Notice: Subject to any disclaimer, the term of this patent is extended or adjusted under 35 U.S.C. 154(b) by 913 days.

(21) Appl. No.: 10/193,329

(22) Filed: Jul. 12, 2002

(65) Prior Publication Data

US 2003/0160997 A1   Aug. 28, 2003

(30) Foreign Application Priority Data

Feb. 22, 2002 (JP) ............................. 2002-045906

(51) Int. Cl.
*G06F 15/00* (2006.01)
*G06K 15/02* (2006.01)

(52) U.S. Cl. .................................... 358/1.15; 358/1.14

(58) Field of Classification Search ........ 358/1.1–1.18; 709/223, 224, 228–232; 710/3, 7, 8, 9, 31–34, 710/46–47

See application file for complete search history.

(56) References Cited

U.S. PATENT DOCUMENTS

| | | | |
|---|---|---|---|
| 5,802,260 A * | 9/1998 | Shimakawa et al. | 358/1.15 |
| 6,990,408 B1 * | 1/2006 | Iwase et al. | 701/200 |
| 2002/0080398 A1 * | 6/2002 | Matsushima | 358/1.15 |

* cited by examiner

*Primary Examiner*—Douglas Q. Tran
(74) *Attorney, Agent, or Firm*—Staas & Halsey LLP

(57) ABSTRACT

A print system is provided in which security of information is enhanced, and waste of print is reduced. The print system comprises a print data management system and a printer. The print data management system includes a print data receiving portion for receiving print data from a terminal, a print data storage portion for storing the received print data, a URL informing portion for informing the storage location information of the print data to a user of a terminal, an extraction portion for extracting print data requested by the printer from the print data storage portion, and a transmission portion for transmitting the extracted print data to the printer. The printer includes a URL obtaining portion for obtaining storage location information from the user who came to the place where the printer is installed, a print data requesting portion for requesting the print data management system for print data of the obtained storage location information, and a print controlling portion for printing in accordance with the print data received from the print server.

8 Claims, 9 Drawing Sheets

| USER NAME | ELECTRONIC MAIL ADDRESS OF CELL PHONE | CREDIT CARD IDENTIFICATION | PRINT ALLOWANCE |
|---|---|---|---|
| user A | 09012xxxxxx@aa.bb.jp | 1234-xxxx-xxxx-xxxx | |
| user B | 09034xxxxxx@cc.dd.jp | 9876-xxxx-xxxx-xxxx | ALLOWED |
| user C | 07056xxxxxx@pp.qq.jp | 5432-xxxx-xxxx-xxxx | |
| ⋮ | ⋮ | ⋮ | ⋮ |

RECEIVED YOUR PRINT DATA "MEETING DOCUMENT.oas".
URL IS SET FORTH BELOW.
CHARGE FOR PRINT FEE IS ACCEPTED?

http://printserver.fujitsu.xx.jp/abc/1227%es#Zsmnm23$ — D6

BN11    BN12

OK    CANCEL    HG1

PRIOR ART

PRINT SYSTEM, PRINT DATA MANAGEMENT SYSTEM AND PRINTER

BACKGROUND OF THE INVENTION

1. Field of the Invention

The present invention relates to a print system including a printer that can be shared by plural terminals.

2. Description of the Prior Art

FIG. 9 is a diagram showing an example of the conventional print system 1Z. Conventionally, in order to use hardware resources efficiently, various methods for sharing one printer by plural terminals on a network are proposed and realized.

For example, a method is proposed recently in which IPP (Internet Printing Protocol) is used as a communication protocol for sharing a printer 2Z as shown in FIG. 9. Since the IPP is a communication protocol based on HTTP (Hypertext Transfer Protocol), the terminal 3Z can transmit a print job to the printer 2Z beyond a router or a firewall by designating the printer 2Z with a URL (Uniform Resource Locators). Therefore, the printer 2Z on the Internet can be shared if the terminal 3Z and the printer 2Z can support the IPP.

However, if the terminal 3Z that makes request for printing is at a considerable distance from the printer 2Z that performs printing, it is possible that other person reads the content of the printed matter before the user of the terminal 3Z goes to take the printed matter. Furthermore, some users often leave the printed matter as they are bothered to go to the printer 2Z. Such users may increase if the range of terminals 3Z sharing the printer 2Z is enlarged. Thus, according to the conventional print system 1Z, useless print occurs in large quantity resulting in waste of paper and ink.

SUMMARY OF THE INVENTION

An object of the present invention is to provide a print system using a network, in which information security is enhanced and waste of print can be reduced.

A print system according to the present invention comprises a print server for managing print data and one or more printers for outputting printed matter in accordance with the print data. The print server includes a print data receiving portion for receiving print data from a terminal, a print data storage portion for storing the received print data, an informing portion for informing storage location information indicating the storage location of the stored print data to a user of a terminal that transmitted the print data, an extraction portion for extracting print data requested by the printer from the print data storage portion, and a transmission portion for transmitting the extracted print data to the printer that made the request. The printer includes a storage location information obtaining portion for obtaining the storage location information that was informed to the user who came to the place where the printer is installed from the user, a request portion for requesting the print server to transmit the print data of the storage location indicated by the storage location information to the printer, and a print portion for printing in accordance with the print data received from the print server.

A print data management system according to the present invention is a print data management system that is used for a print system including one or more printers for outputting printed matter in accordance with the print data. The print data management system comprises a print data receiving portion for receiving print data from a terminal, a print data storage portion for storing the received print data, an informing portion for informing storage location information indicating memory location of the stored print data to the user of the terminal that transmitted the print data, an extraction portion for extracting print data of the memory location indicated in the storage location information designated by the printer from the print data storage portion, and a transmission portion for transmitting the extracted print data to the printer that made the designation.

Preferably, the print data management system further comprises a user information storage portion for storing user identification for identifying user for each user, and a user identification obtaining portion for obtaining the user identification of the user of the terminal when the print data receiving portion receives the print data from the terminal. The print data receiving portion receives the print data if the user identification obtained by the user identification obtaining portion is identical to one of the user identification stored in the user information storage portion.

In another preferred embodiment, the user identification is an electronic mail address of a portable terminal of the user corresponding to the user identification, and the informing portion informs to the user by transmitting the storage location information to the electronic mail address of the user.

In still another preferred embodiment, the print data management system further comprises a charge processing portion for charging the print fee to the user. The user information storage portion stores charge destination information indicating charge destination for the print fee of the user corresponding to the user identification for each of the user identification, and the charge processing portion performs the charge process for the print data received by the print data receiving portion in accordance with the charge destination information corresponding to the user identification when receiving the print data.

In still another preferred embodiment, the print data management system further comprises an inquiry portion for making an inquiry about whether the user accepts charge for the print fee of the print data or not after the print data receiving portion received the print data from the terminal. If the inquiry portion received allowance of the charge for the print fee from the user, the charge process by the charge processing portion becomes possible, and the print data transmission by the transmission portion becomes possible.

A printer according to the present invention is a printer that is used for a print system including a print server for storing print data. The printer comprises a storage location information obtaining portion for obtaining storage location information indicating memory location of print data from a user who came to the place where the printer is installed, a request portion for requesting the print server to transmit the print data at the memory location indicated by the obtained storage location information to the printer, and a print portion for printing in accordance with the received print data.

BRIEF DESCRIPTION OF THE DRAWINGS

FIG. 5 is a diagram showing an example of user information stored in a user information storage portion.

FIG. 6 is a diagram showing an example of a check screen.

DESCRIPTION OF THE PREFERRED EMBODIMENTS

Hereinafter, the present invention will be explained more in detail with reference to embodiments and drawings.

Figure 1:
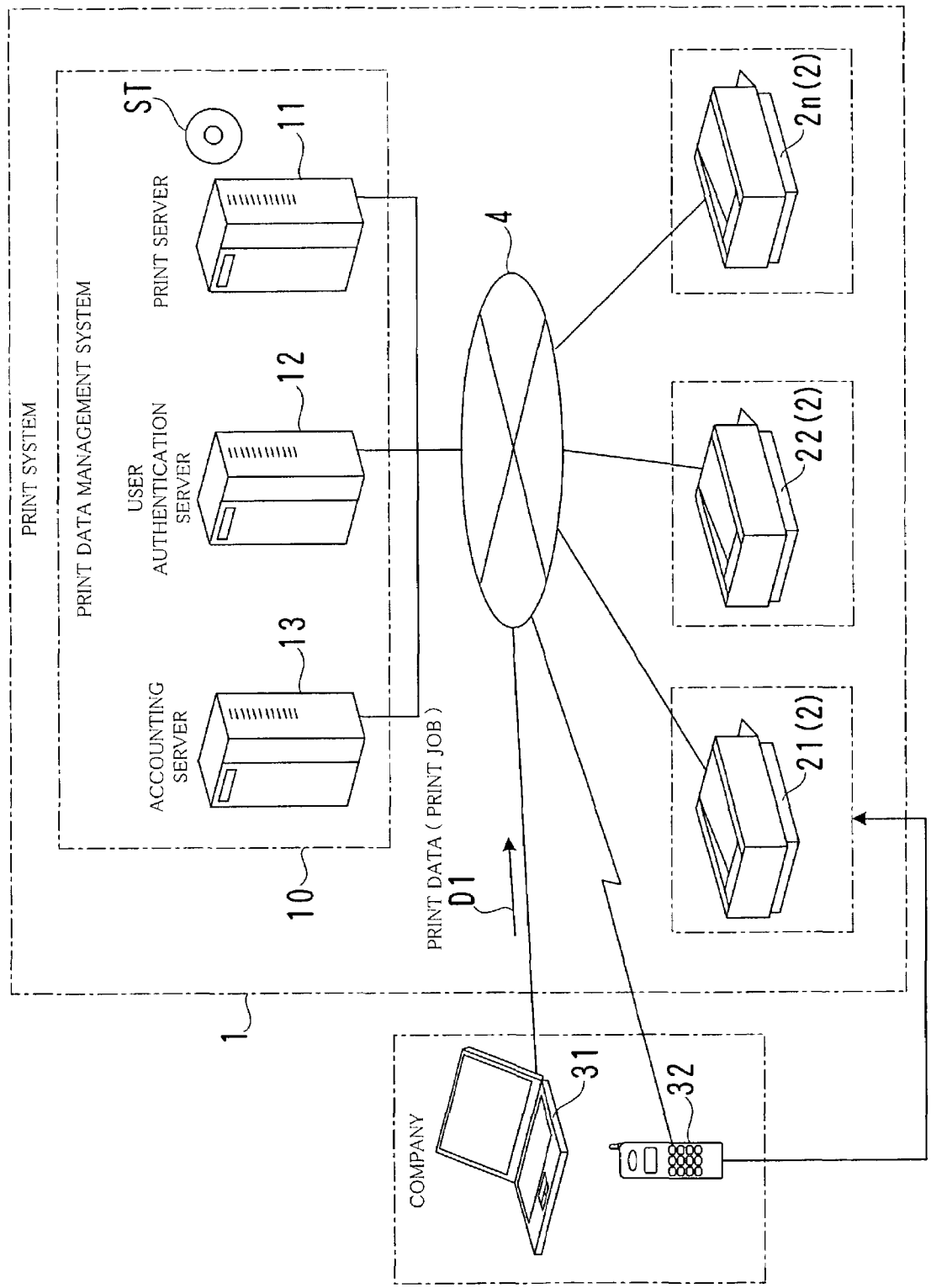
FIG. 1 is a diagram showing an example of a print system according to the present invention.
Figure 2:
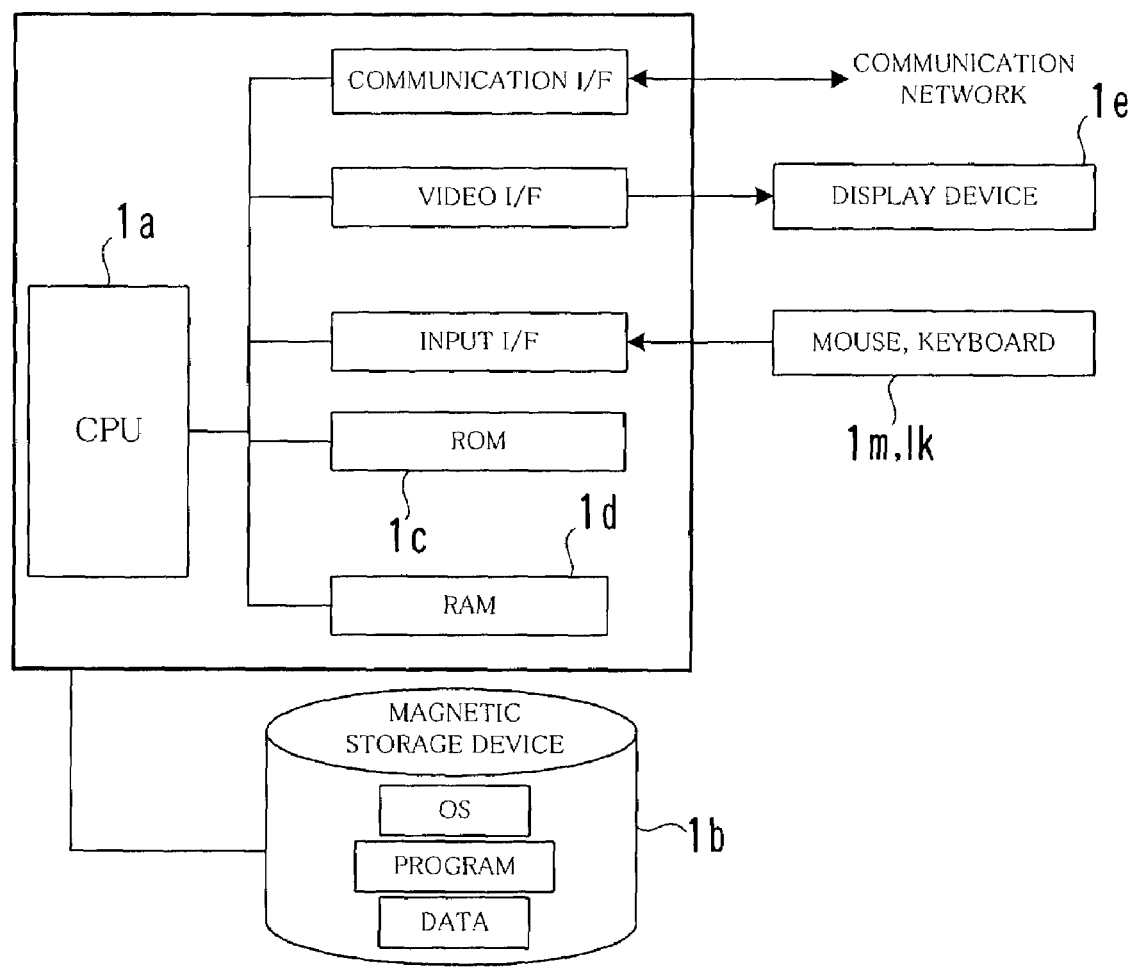
FIG. 2 is a diagram showing an example of a hardware structure of a print server and others.
Figure 3A:
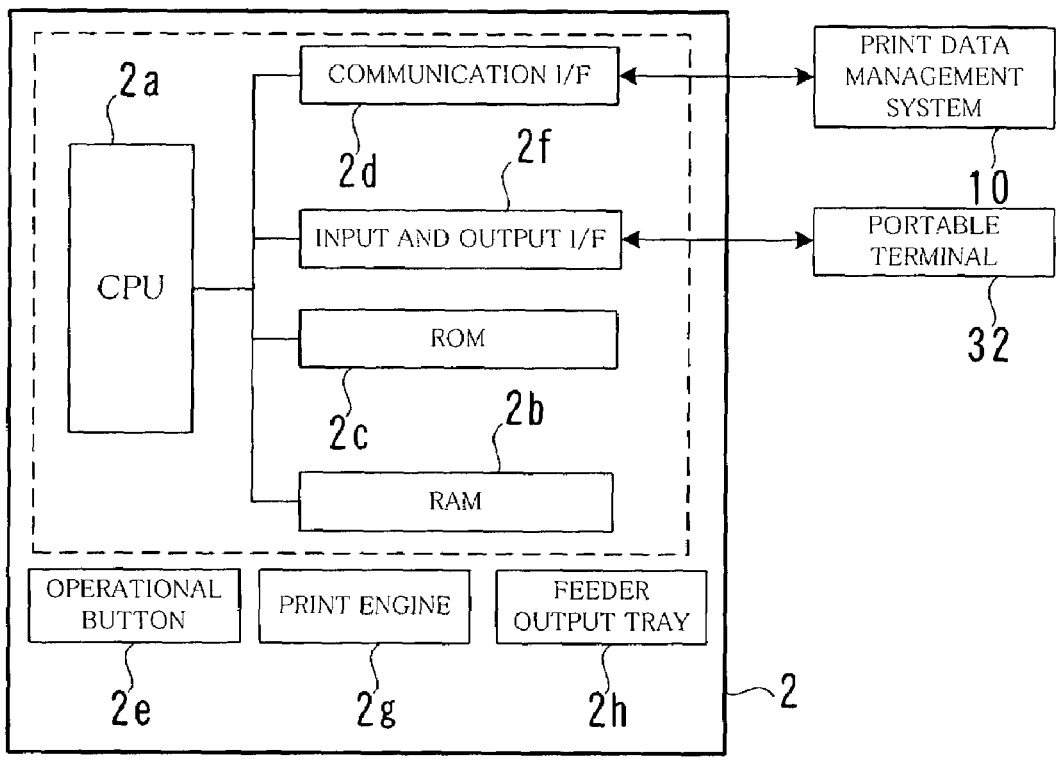
FIGS. 3A and 3B are diagrams showing examples of a hardware structure of a printer.
Figure 3B:
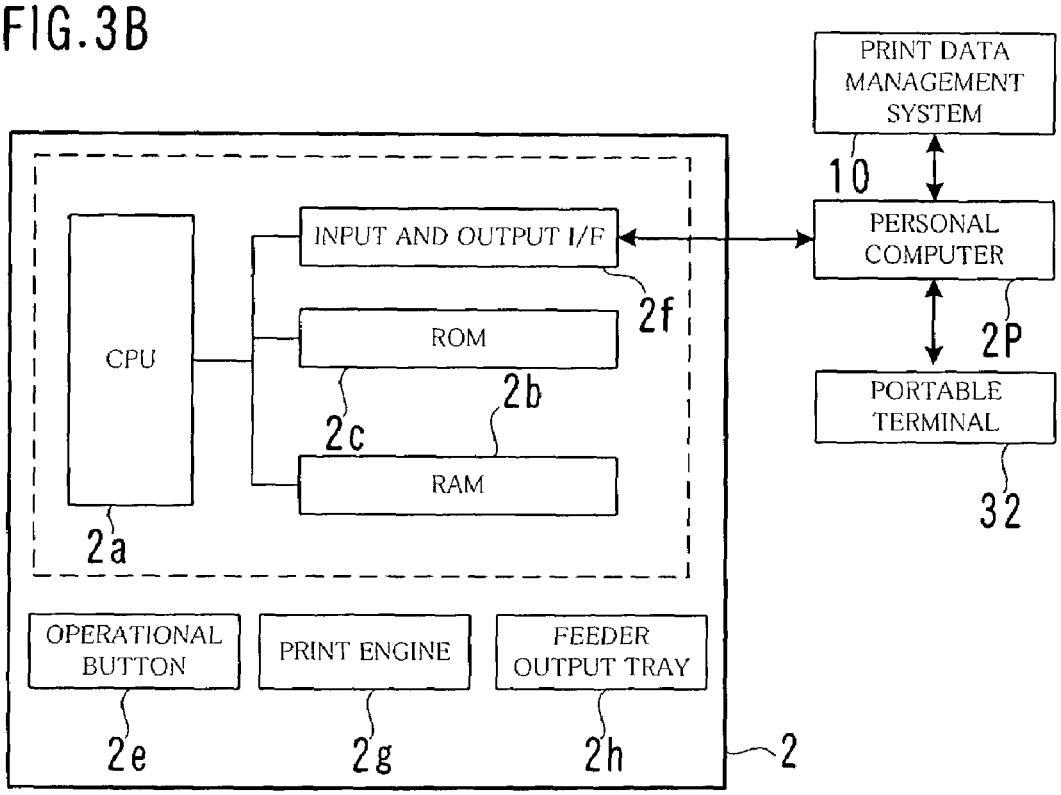
Figure 4:
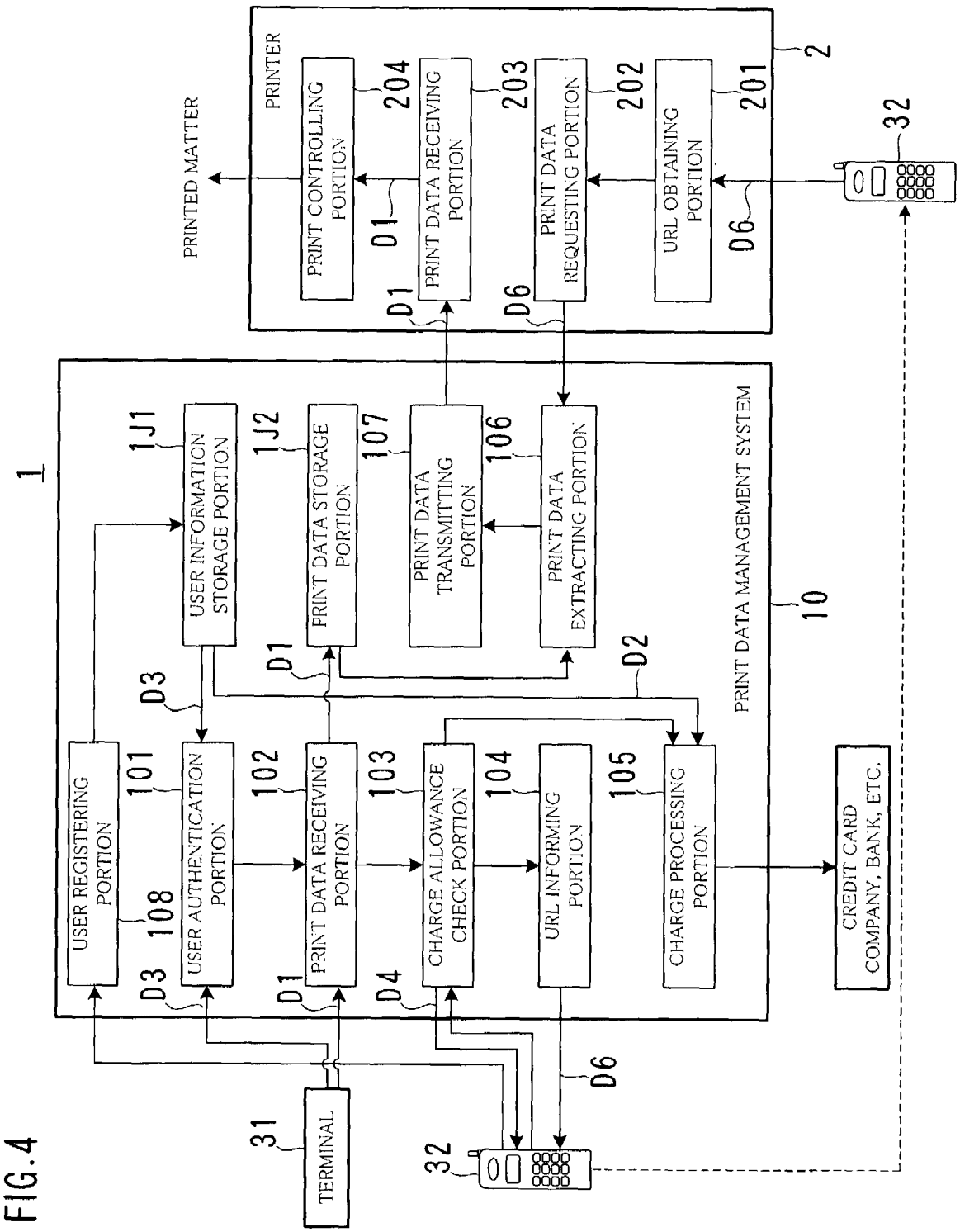
FIG. 4 is a diagram for explaining an example of a functional structure of a print data management system and the printer.

FIG. 1 is a diagram showing an example of a print system 1 according to the present invention. FIG. 2 is a diagram showing an example of a hardware structure of a print server 11 and others. FIGS. 3A and 3B are diagrams showing examples of a hardware structure of a printer 2. FIG. 4 is a diagram for explaining an example of a functional structure of a print data management system 10 and the printer 2. FIG. 5 is a diagram showing an example of user information stored in a user information storage portion 1J1. FIG. 6 is a diagram showing an example of a check screen HG1.

As shown in FIG. 1, the print system 1 according to the present invention comprises a print data management system 10, a plurality of printers 2 (21, 22, . . . , 2n) and a communication network 4. Each server constituting the print data management system 10, such as a print server 11, a user authentication server 12 and an accounting server 13, and each printer 2 are connected to each other via the communication network 4.

The communication network 4 can be the Internet, an intranet, a public telephone network or a private line. Furthermore, as a communication protocol, TCP/IP and its host protocol such as HTTP (Hypertext Transfer Protocol), SMTP (Simple Mail Transfer Protocol), POP3 (Post Office Protocol 3), and IPP (Internet Printing Protocol) can be used.

A terminal 31 has a Web browser function and an electronic mail function for communicating data with each device of the print system 1. In addition, a driver is installed for converting a document, a graph or an image into a print job that can be printed by the printer 2. Hereinafter, such a print job is referred to as "print data D1". The terminal 31 can be a personal computer or a workstation.

The user of the terminal 31 can receive the service provided by the print system 1. It is supposed that the printer 2 is installed in a convenience store, in a paperwork service store, in a hotel or in a public facility. When going out on business, the user can obtain the printed matter from each of the printers 2 that is located near the destination if he or she has transmitted a print instruction, i.e., print data D1 from a terminal 31 in the company to the print server 11.

A portable terminal 32 is a carrying type terminal that can be connected to a cell phone network or a PHS network. An electronic mail address is assigned to this portable terminal 32 for an electronic mail service (what is commonly called cell phone mail) provided by a mobile communication company. The portable terminal 32 can be a cell phone, a PHS cell phone, a note type personal computer or a PDA (Personal Digital Assistant).

The print server 11 performs mainly management of print data D1 received from the terminal 31. The user authentication server 12 performs mainly authentication about whether the user of the terminal 31 has the authority to use the print data management system 10. The accounting server 13 performs mainly process about fee for service provided to the user of the terminal 31, management of personal data of members and registration of new members.

Each of these servers 11–13 comprises a CPU 1a, a magnetic storage device 1b, a ROM 1c, a RAM 1d, an input device such as a mouse 1m or a keyboard 1k and a display device 1e, as shown in FIG. 2. The magnetic storage device 1b stores an operating system (OS) and various programs and data for realizing functions that will be explained later. These programs are installed from a recording medium ST such as a CD-ROM, an MO or a DVD-ROM into the magnetic storage device 1b. These programs and data are loaded into the RAM 1d and executed by the CPU 1a. The servers 11–13 can be a UNIX server, a workstation or a personal computer. The print data management system 10 shown in FIG. 1 performs the above-mentioned process by three servers. However, one server or four or more servers may perform the process depending on a scale of the print system 1 or the number of users who use the print system 1.

The printer 2 includes a CPU 2a, a RAM 2b, a ROM 2c, a communication interface 2d, an operational button (an input button) 2e, an input and output interface 2f, a print engine 2g and a feeder output tray 2h as shown in FIG. 3A. The ROM 2c stores various programs and data for realizing functions that will be explained later. Each program is executed by the CPU 2a.

An IPP supporting printer is used as the printer 2. Therefore, the print data D1 are transmitted from the terminal 31 to the printer 2 via a router or a firewall placed inside or outside the print system 1. The print data D1 that arrived at the printer 2 are stored in the RAM 2b.

The print engine 2g performs printing on sheets of paper responding to an instruction that the CPU 2a outputs in accordance with the print data D1 and ejects the printed matter to the feeder output tray 2h. The operational button 2e is used for the user to designate the print data or others for the printer 2. The input and output interface 2f is used for communicating data with the portable terminal 32 of the user. The input and output interface 2f can be a serial port, a USB (Universal Serial Bus) or IEEE1394, for example. Alternatively, a wireless interface such as Bluetooth can be used. In addition, a recording medium such as a memory card can be used for passing data.

Furthermore, as shown in FIG. 3B, the printer 2 can be connected to the personal computer 2P via the input and output interface 2f, so that the printer 2 and the personal computer 2P constitute a set of printer. An application program for controlling the printer 2 is installed in the personal computer 2P. Thus, the user can designate the print data for the printer 2 by operating the keyboard or the mouse of the personal computer 2P instead of the operational button 2e of the printer 2. In addition, since the data communication between the print data management system 10 and the portable terminal 32 is performed by the personal computer 2P, process load of the printer 2 can be reduced.

According to this structure, as shown in FIG. 4, functions including a user information storage portion 1J1, a print data storage portion 1J2, a user authentication portion 101, a print data receiving portion 102, a charge allowance check portion 103, a URL informing portion 104, a charge processing portion 105, a print data extracting portion 106, a print data transmitting portion 107 and a user registering portion 108 are realized in the print data management system 10. Furthermore, functions including a URL obtaining portion 201, a print data requesting portion 202, a print data receiving portion 203 and a print controlling portion 204 are realized in the printer 2.

The user information storage portion 1J1 stores personal information of users, i.e., members who can utilize the service provided by the print system 1 as shown in FIG. 5. Each of the users is discriminated by user identification D3. The user identification D3 can be an electronic mail address of the portable terminal 32 of the user, for example. Card information D2 indicates a credit card identification that is used for paying the fee for the service provided by the print system 1.

The user registering portion 108 performs user registration of a user who wants to be a member of the print system 1. The user who wants to be a member operates the terminal 31 or the portable terminal 32 to have access to the print data management system 10 and inputs his or her name, an electronic mail address of the portable terminal 32 and a credit card identification that is used for paying the print fee. The user registering portion 108 registers the name, the electronic mail address and the credit card identification in connection with each other in the user information storage portion 1J1.

The user authentication portion 101 performs authentication of the user who intends to use the print system 1, about whether the user is registered or not. For example, when the user wants to print a document created in the terminal 31, the authentication is performed in the following procedure. First, the user inputs the electronic mail address of his or her portable terminal 32 in the terminal 31 and requests the authentication to the print data management system 10. Then, the user authentication portion 101 checks whether the received electronic mail address is identical to one of the user identification D3 stored in the user information storage portion 1J1 or not. If it is identical, the user is regarded to be registered, and the terminal 31 is informed of the result.

When the authentication is completed correctly, the print data receiving portion 102 is in the state where the print data D1 transmitted from the terminal 31 of the authenticated user can be received. After checking this state, the user can transmit print data D1 of a desired document to the print data management system 10 so as to perform the print instruction. The Internet printing protocol (IPP) is used for transmitting the print data D1. Therefore, the user can designate various options depending on the function of the destination printer 2, such as plural sets of print, a two-sided print, a color print or a reduction or enlargement print.

The print data D1 received by the print data receiving portion 102 are accumulated (stored) in the print data storage portion 1J2 as a print queue. The stored print data D1 can be referred by e.g., a WWW browser since the memory location is indicated by a URL in such a way as "http://printserver.yyyyy.xx.jp/printjob/print data name", for example. However, a unique file name is created as the "print data name" in the above-mentioned URL for discriminating each of the received print data D1.

The charge allowance check portion 103 inquires of the user who sent the print data D1, so as to check whether he or she accepts the charge for the print fee. First, an inquiry program P4 is transmitted to the electronic mail address indicated by the user identification D3 of the user.

The portable terminal 32 that received the inquiry program P4 performs the program and displays the check screen HG1 as shown in FIG. 6. When the button BN11 is selected in the check screen HG1, the acceptance of the charge for the print fee is informed to the print data management system 10.

Receiving this information, the charge allowance check portion 103 updates print allowance information D5 corresponding to the print data D1 into "allowed" as shown in FIG. 5. If the button BN12 is selected in the check screen HG1, the print service is halted, and the print data D1 of the user are removed from the print data receiving portion 102. The inquiry program P4 is described in a language such as Java supported by the portable terminal 32.

The charge processing portion 105 performs a process for charging the print fee in accordance with the card information D2 after the allowance of the charge is confirmed. Namely, the print fee for the user who requested the print is calculated. The calculation of the print fee is performed in accordance with data quantity of the print data D1 received from the user, the number of pages indicated in the print data D1, the number of copies, a type of the paper sheets and print options such as color print or not, for example. Then, the card information D2 is searched in accordance with the user identification D3 of the user who asked the print from the user information storage portion 1J1, and a process for charging the print fee to the credit card company is performed in accordance with the credit card identification indicated in the card information D2.

The URL informing portion 104 notifies the storage location information D6 indicating the URL of the print data D1 stored in the print data receiving portion 102 to the portable terminal 32 of the user who sent the print data D1. The storage location information D6 is transmitted together with the inquiry program P4 to the portable terminal 32. The portable terminal 32 that received the storage location information D6 displays the URL of the print data D1 on the screen as shown in FIG. 6. It is possible to transmit the storage location information D6 after the allowance of the charge is confirmed by the charge allowance check portion 103.

The URL obtaining portion 201 of the printer 2 obtains the storage location information D6 from the portable terminal 32 of the user who came to get the printed matter. The storage location information D6 is obtained via an interface such as USB or Bluetooth. It is possible to display an input screen on the display panel of the printer 2 or the display device of the personal computer 2P, so that the user inputs the URL of the storage location information D6. Thus, it is possible to support the case where the user failed to bring the portable terminal 32 or the case where the battery of the portable terminal 32 ran down if the user has made a memo of URL shown in FIG. 6 in a notebook, etc.

The print data requesting portion 202 requests the print data management system 10 to transmit the print data D1 of the memory location indicated in the obtained storage location information D6 to this printer 2.

Receiving this request, the print data extracting portion 106 of the print data management system 10 extracts the print data D1 of the user from the print data storage portion 1J2. The extracted print data D1 are transmitted to the printer 2 by the print data transmitting portion 107.

This print data D1 are received by the print data receiving portion 203. The print controlling portion 204 performs the process for printing in accordance with this print data D1 and passing the printed matter to the user.

Figure 7:
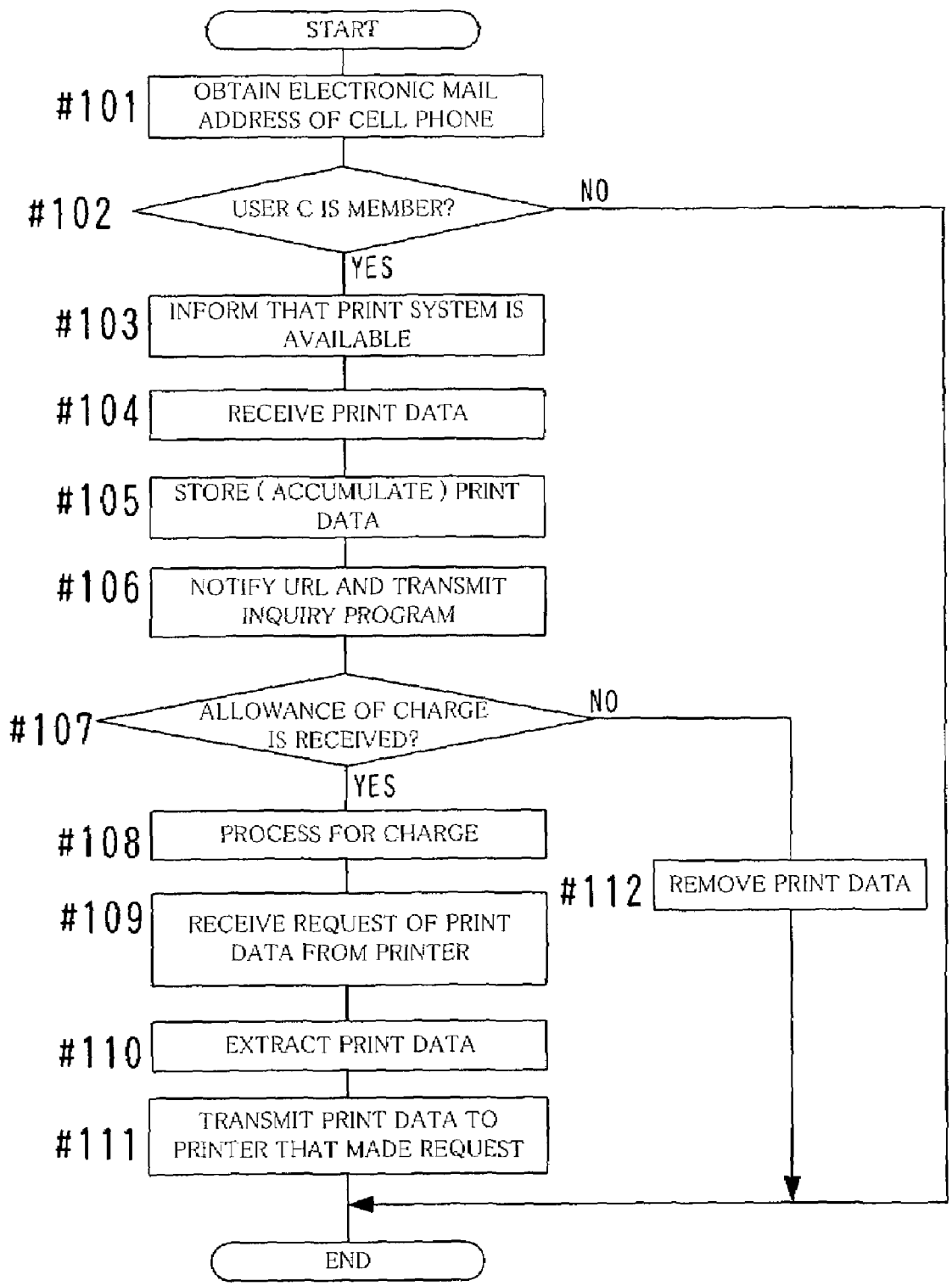
FIG. 7 is a flowchart for explaining the process flow of the print data management system.
Figure 8:
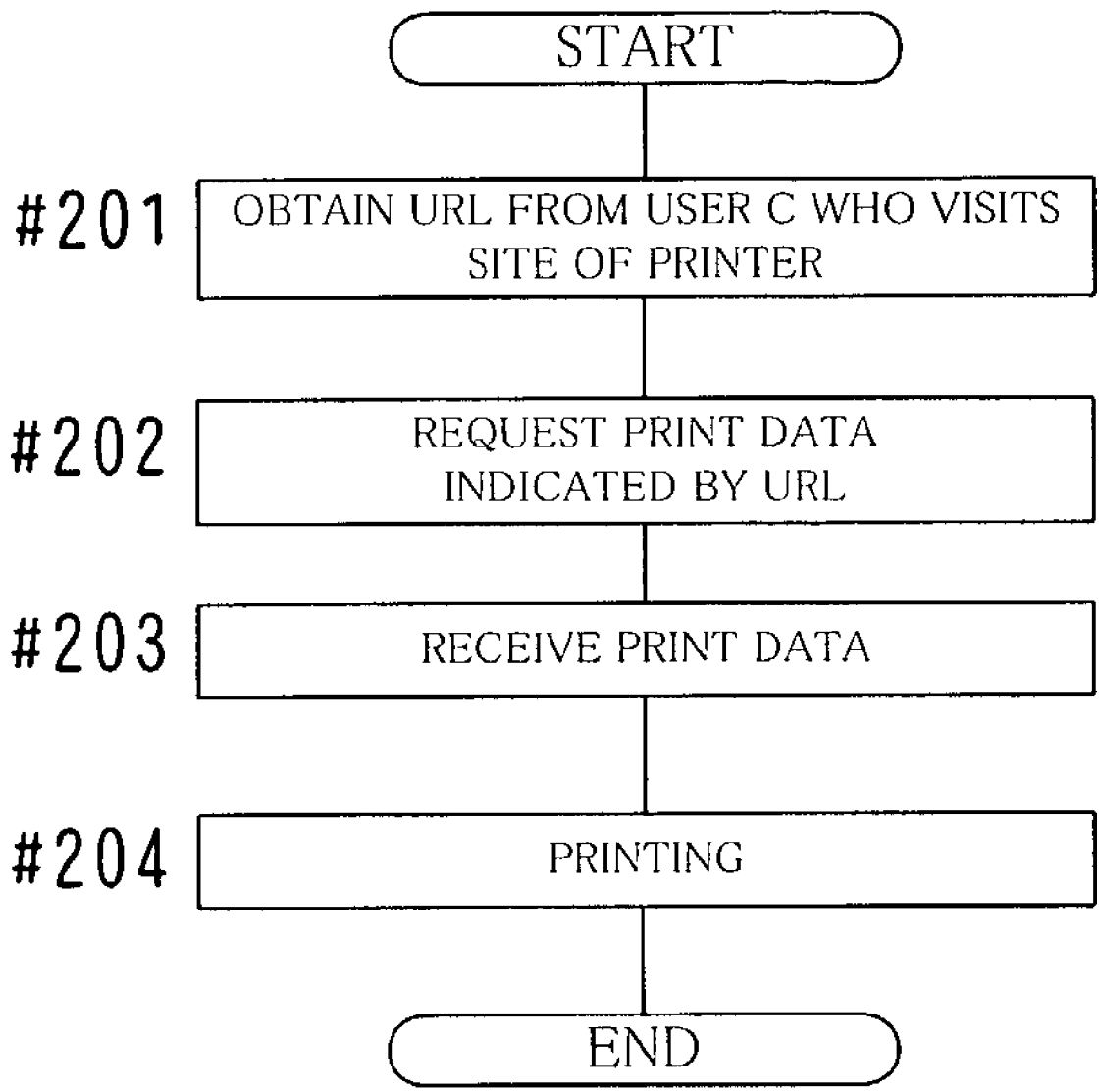
FIG. 8 is a flowchart for explaining the process flow of the printer.
Figure 9:
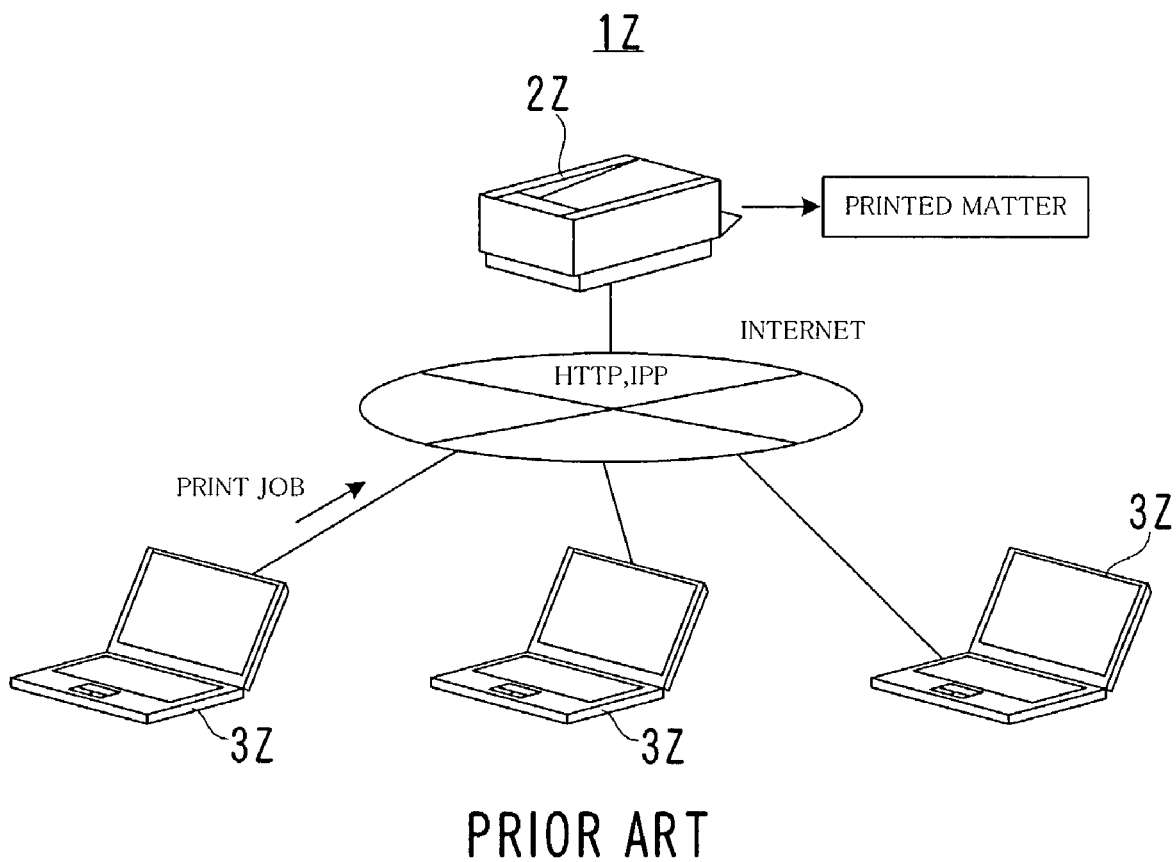
FIG. 9 is a diagram showing an example of the conventional print system.

Next, the process flow of the print data management system 10 and the printer 2 will be explained with reference to flowcharts. FIG. 7 is a flowchart for explaining the process flow of the print data management system 10. FIG. 8 is a flowchart for explaining the process flow of the printer 2.

For example, it is supposed that a certain paper work service company runs the print system 1 and has local branch offices. This paper work service company has the print data management system 10 installed in the computing center in the head office and the printers 2 installed in the branch offices. Furthermore, the printer 2 is also installed in each of facilities such as a convenience store, an event hall, a business building, a hotel or a public office under a contract. Each of the printers 2 can be used only by members of the paper work service company, i.e., registered members as shown in FIG. 5.

It is supposed that a user C who is a member of a paper work service company visits a customer located in a considerable distance on business. Data of documents for the business meeting are already completed, but the copies of the documents for all members of the meeting will be a high pile for carrying. In addition, a package delivery service will not be on time for the start time of the meeting. Therefore, the user C determined to prepare the copies of the documents utilizing the print system 1.

The user C has access to the print data management system 10 from the terminal 31 in the company and inputs the electronic mail address of his or her portable terminal 32, which is transmitted to the print data management system 10.

On this occasion, the print data management system 10 decides whether the user C is a member or not in accordance with the electronic mail address obtained from the terminal 31 as shown in FIG. 7 (#101, #102). Namely, it is checked whether the obtained electronic mail address is registered (stored) in the user information storage portion 1J1 or not. If it is registered, the user is regarded to be a member.

After confirming the user C is a member (Yes in #102), the terminal 31 is informed that the print system 1 can be used (#103), and the print data D1 can be received from the terminal 31 of the user C.

After receiving this information, the user transmits the print data D1 of the documents for the business meeting to the print data management system 10. If there are plural sets of documents, the print data D1 of the documents are transmitted in sequence or in the mass.

The print data management system 10 receives the print data D1 from the terminal 31 (#104) and accumulates them as a print queue (#105). When all the print data D1 are received, the storage location information D6 indicating the memory location, i.e., the URL of these print data D1 and the inquiry program P4 are transmitted to the portable terminal 32 of the user C (#106).

The portable terminal 32 performs the inquiry program P4 so as to display the check screen HG1 shown in FIG. 6. The user C selects the button BN11 of the check screen HG1. Then, the allowance of the charge is informed to the print data management system 10.

When receiving the allowance of the charge from the user C (Yes in #107), the print data management system 10 searches the card information D2 of the user C from the user information storage portion 1J1 and performs the process for charging the print fee (#108). If the allowance of the charge is not received (No in #107), the print data D1 of the user C are removed from the print data storage portion 1J2 (#112), and the series of processes are finished.

Necessary processes before the user C goes out are completed as explained above. The user C leaves the company with the portable terminal 32 and drops in a local office of the paper work service company or a facility in partnership with the company. Then, the storage location information D6 is entered in the printer 2 installed in the local office or the facility.

As shown in FIG. 8, the printer 2 requires the print data management system 10 to transmit the print data D1 in accordance with this storage location information D6 (#201, #202). Namely, the printer 2 accesses to the print data management system 10 and demands the print data D1 of the memory location indicated in the storage location information D6.

The print data management system 10 extracts (searches) the print data D1 from the print data storage portion 1J2 responding to the demand from the printer 2 and transmits the print data D1 to the printer 2 that made the demand (#109–#111). The print data D1 are deleted from the print data storage portion 1J2 after the transmission is completed or receiving the notice indicating the completion of the print from the printer 2.

The printer 2 performs the printing process in accordance with the received print data D1 and ejects the printed matter (#203, #204). If there are plural documents to be printed, the process from Step #201 through Step #203 is repeated. Then, the user C received the printed matter and heads to the customer.

According to this embodiment, the user who requested the print visits the site of the printer 2 and prints the user document, so there is little possibility that the printed matter is observed by other person before the user takes it as conventional method. Therefore, security of the information can be higher than the conventional method. In addition, there is little possibility that the user forgets to take the printed matter after giving print instruction as conventional method, so waste of resources can be reduced. Furthermore, there is little possibility that the user reluctantly comes to the printer to take the printed matter as conventional method, there are less printed matters accumulated in the printer 2.

The user can select the printer 2 for printing even after transmitting the print instruction from the terminal 31. Therefore, even if the destination of the business trip of the user C is changed in the example explained above with reference to FIGS. 7 and 8, the user C can obtain the printed matter from the printer 2 located near the destination of the business trip after the change. In addition, even if the user cannot check the location of the place where a printer 2 is installed, the user can hasten to transmit the print instruction to the print data management system 10 for leaving the company soon. In this case, the user can check the nearest location where a printer 2 is installed during free time on the way to the destination by using the portable terminal 32 for the Internet search or for making a call to staff in the destination office.

Since the process of payment for the print fee is performed by using the credit card identification that is registered, the user is not required to enter the credit card identification number every time of printing. Therefore, the user can be relieved from worrying about leakage of the credit card identification, and use of the print system 1 can be promoted.

After the print instruction is transmitted, the URL of the print data D1 is informed to the portable terminal 32 of the user that is registered, so a use of other people without authority can be protected. In addition, since the user's intention of printing is reaffirmed by the check screen HG1, waste of print due to an operation error can be eliminated.

Though the check of the print fee charge is performed by transmitting the inquiry program P4 to the portable terminal 32 in this embodiment, other methods can be used. For example, the print data management system 10 can include an inquiry program using CGI (Common Gateway Interface). It is possible to transmit an electronic mail that informs of the charge to the portable terminal 32 and to perform the charge process when receiving a response to the electronic mail. There is another method that includes the steps of making a call to the portable terminal 32 for guiding the charge with speech sound, and performing the charge process when a predetermined push button is pressed.

In order to input the URL in the printer 2, the printer 2 is connected to the portable terminal 32 via a serial cable or an interface such as Bluetooth. However, other methods can be adopted. For example, the printer 2 is provided with an OCR function so that characters of the URL of the check screen HG1 shown in FIG. 6 can be read. Alternatively, the URL is converted into a bar code, which is displayed on the check screen HG1 so that the bar code can be read by using a bar code reader connected to the printer 2.

It is possible to utilize the print system 1 like a facsimile machine. For example, when a user X transmits a document to a user Y, the user X first transmits the print data D1 of the document from the terminal 31 to the print data management system 10. Then, the portable terminal 32 of the user X is informed of the URL of the print data D1. The user X notifies the URL to the user Y. The user Y inputs the URL into the printer 2 located in the vicinity of him or her, so as to obtain the printed matter.

The structure of the whole or a part of the print system 1, the print data management system 10, the printer 2, the terminal 31, the portable terminal 32, the process contents, the process order, the communication protocol and the program language can be changed in the scope of the present invention.

According to the present invention, security of information can be enhanced and waste of print can be reduced.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A print system comprising a print server for managing print data and one or more printers for outputting printed matter in accordance with the print data, the print server including
a print data receiving portion for receiving print data from a terminal,
a print data storage portion for storing the received print data,
an informing portion for informing storage location information indicating the storage location of the stored print data to a user of a terminal that transmitted the print data,
an extraction portion for extracting print data requested by the printer from the print data storage portion, and
a transmission portion for transmitting the extracted print data to the printer that made the request; and the printer including
a storage location information obtaining portion for obtaining the storage location information that was informed to the user who came to the place where the printer is installed from the user,
a request portion for requesting the print server to transmit the print data of the storage location indicated by the storage location information to the printer, and
a print portion for printing in accordance with the print data received from the print server.

2. A print data management system that is used for a print system including one or more printers for outputting printed matter in accordance with print data, the print data management system comprising:
a print data receiving portion for receiving print data from a terminal;
a print data storage portion for storing the received print data;
an informing portion for informing storage location information indicating memory location of the stored print data to the user of the terminal that transmitted the print data;
an extraction portion for extracting print data of the memory location indicated in the storage location information designated by the printer from the print data storage portion; and
a transmission portion for transmitting the extracted print data to the printer that made the designation.

3. The print data management system according to claim 2, further comprising a user information storage portion for storing user identification for identifying user for each user, and a user identification obtaining portion for obtaining the user identification of the user of the terminal when the print data receiving portion receives the print data from the terminal, wherein the print data receiving portion receives the print data if the user identification obtained by the user identification obtaining portion is identical to one of the user identification stored in the user information storage portion.

4. The print data management system according to claim 3, wherein the user identification is an electronic mail address of a portable terminal of the user corresponding to the user identification, and the informing portion informs to the user by transmitting the storage location information to the electronic mail address of the user.

5. The print data management system according to claim 3, further comprising a charge processing portion for charging the print fee to the user, wherein the user information storage portion stores charge destination information indicating charge destination for the print fee of the user corresponding to the user identification for each of the user identification, and the charge processing portion performs the charge process for the print data received by the print data receiving portion in accordance with the charge destination information corresponding to the user identification when receiving the print data.

6. The print data management system according to claim 5, further comprising an inquiry portion for making an inquiry about whether the user accepts charge for the print fee of the print data or not after the print data receiving portion received the print data from the terminal, wherein if the inquiry portion received allowance of the charge for the print fee from the user, the charge process by the charge processing portion becomes possible, and the print data transmission by the transmission portion becomes possible.

7. A printer that is used for a print system including a print server for storing print data, the printer comprising:
a storage location information obtaining portion for obtaining storage location information indicating memory location of print data from a user who came to the place where the printer is installed;

a request portion for requesting the print server to transmit the print data at the memory location indicated by the obtained storage location information to the printer; and a print portion for printing in accordance with the received print data.

8. A computer-readable storage medium storing a computer program for a computer of a print system including one or more printers for outputting printed matter in accordance with print data, the program making the computer perform the process comprising the steps of:

receiving print data from a terminal;

storing the received print data in a storage portion;

informing the user of the terminal that transmitted the print data of storage location information indicating memory location of the stored print data;

extracting print data at the memory location indicated in the storage location information designated by the printer from the print data storage portion; and transmitting the extracted print data to the printer that made the designation.

* * * * *